3,086,974
PHOSPHORIC ACID, THIONOPHOSPHORIC ACID, PHOSPHONIC ACID, THIOPHOSPHONIC ACID, PHOSPHINIC ACID AND THIONOPHOSPHINIC ACID DERIVATIVES OF ALKYLSULFONAMIDES
Hanshelmut Schlor, Wuppertal-Barmen, and Gerhard Schrader, Wuppertal-Cronenberg, Germany, assignors to Farbenfabriken Bayer Aktiengesellschaft, Leverkusen, Germany, a corporation of Germany
No Drawing. Filed Sept. 20, 1960, Ser. No. 57,151
Claims priority, application Germany June 5, 1957
21 Claims. (Cl. 260—247.1)

The present invention relates to and has as its objects new and useful derivatives of sulfonic acid amides and a process for their production. Generally the new compounds of the present invention may be represented by the following formula

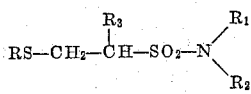

wherein $R_1$ stands for an alkyl radical and $R_2$ for an alkyl radical or hydrogen and wherein the alkyl radicals $R_1$ and $R_2$ may also together form a ring, R denotes any alkyl, aryl or aralkyl radical which may be substituted, and $R_3$ stands for hydrogen or lower alkyl. R may moreover stand for an alkyl or arylcarboxylic acid radical (X—CO) such as for the radical of acetic or benzoic acid, i.e.

$$CH_3-CO-, \quad C_6H_5-CO-$$

and the like.

This application is a continuation-in-part of our copending applications Serial No. 738,282, filed May 28, 1958, and Serial No. 772,700, filed November 10, 1958, both of which applications are now abandoned.

Of especial importance are those compounds wherein R denotes the radical of any dialkyl-phosphoric acid or dialkyl-thionophosphoric acid, for example the radical

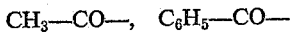

Furthermore R may stand for the radical of any alkyl- or arylphosphonic acid or thiophosphonic acid ester, for example the grouping

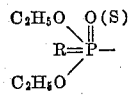

R may also stand for the radical of a dialkyl- or diarylphosphonic acid or thionophosphinic acid, for example the radical

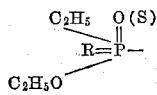

These phosphorus compounds correspond to the following formula

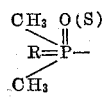

in which R stands for a member selected from the group consisting of O.O-lower alkyl phosphoric acid radicals, O.O-lower alkyl thiophosphoric acid radicals, O-lower alkyl phosphonic acid radicals, O-lower alkyl thionophosphonic acid radicals, phosphinic acid radicals and thionophosphinic acid radicals,

stand for —$NH_2$, lower alkylamino, piperidino and morphorlino, and $R_3$ stands for a member selected from the group consisting of hydrogen and lower alkyl.

These examples of the significance of R in the above mentioned general formula illustrate the great number of compounds obtainable according to this invention, but should not be used to limit this invention thereto.

The new compounds are obtainable by reacting any sulf-hydryl-containing compounds with vinyl-sulfonic acid amides. When using p-chlorophenyl-mercaptan and vinylsulfonic acid diethyl-amide, the reaction proceeds as follows:

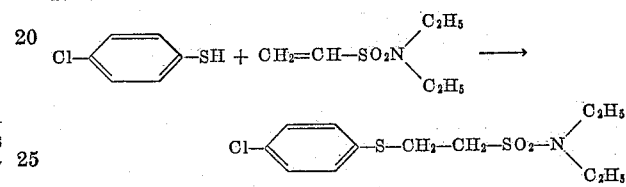

When using dialkyl-dithiophosphoric acids, compounds of the following type are formed:

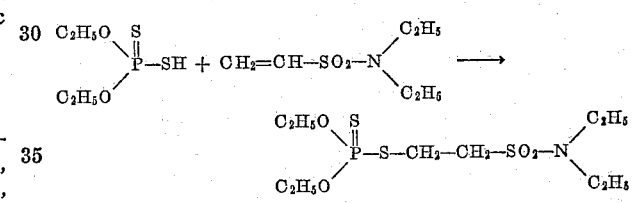

The starting materials, namely the vinyl sulfonic acid amides, may be obtained by a new and interesting process by reacting β-haloethyl sulfonic acid chlorides with 3 mols of a primary or secondary amine. The reaction may be shown by the following reaction scheme:

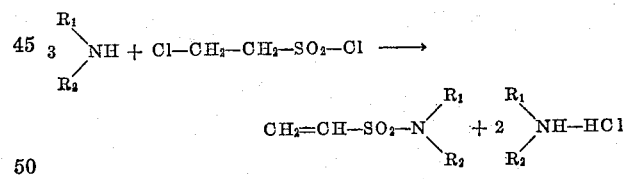

$R_1$ and $R_2$ in these formulae have the same significance as given above.

It is very interesting that in this case the chlorine bond to the sulfonic group is substituted whereas the β-standing chlorine atom in the ethyl radical is split off thus forming the corresponding vinyl compound. The above reaction may be simplified by reacting 1 mol of β-haloethyl-sulfochloride with only 1 mol of a suitable primary or secondary amine and using 2 mols of a tertiary amine as acid-binding agent or hydrohalide-splitting off agent.

The phosphorus containing compounds of this invention may also be made by another process. In α-halomethyl sulfonic acid dialkyl amides as it is known from the literature, the halogen atom is not exchangeable for the radicals of phosphoric acid. In contrast thereto the halogen in the corresponding β-haloethyl sulfonic acid dialkyl amides, not described hitherto and obtainable for instance according to a process as described in the following examples, is easily exchangeable for the radicals of dialkyl thiol- or dialkyl-thiono-thiolphosphoric acids.

Generally this reaction may be shown by the following scheme:

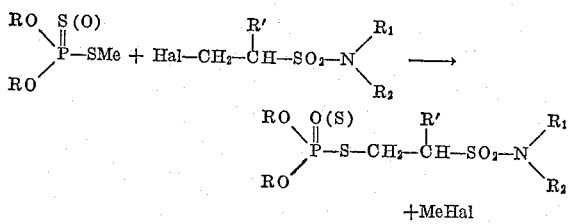

+MeHal

The reaction preferably is carried out by using salts of the dialkyl thio- or dithiophosphoric acids such as the sodium or ammonium salt. It is, however, also possible to mix halides and free phosphoric or thiophosphoric acid esters and to introduce into this mixture an acid-binding agent thereby splitting off halogen halide between the β-chloroethane sulfonic acid amide and the phosphoric acid. Usually the reaction has to be carried out in a suitable inert organic solvent such as alcohols (methanol, ethanol), lower aliphatic ketones (acetone, methyl ethyl ketone), benzene, toluene and the like. Temperatures between which the reaction preferably should be carried out are between about room temperature and the boiling temperature of the solvent used. Usually such temperatures may be between about 30 to 90° C.

The new compounds of the present invention, especially the phosphoric acid and thiophosphoric acid esters, very effectively kill insects like flies, mites, aphids, etc. They distinguish themselves by a good insecticidal action while having a low toxicity against warm-blooded animals. Most surprisingly they are of remarkable low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with a commercial emulsifier), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

The insecticidal activity of the inventive compounds may be seen from the following test results.

Aqueous dilutions of the following compounds:

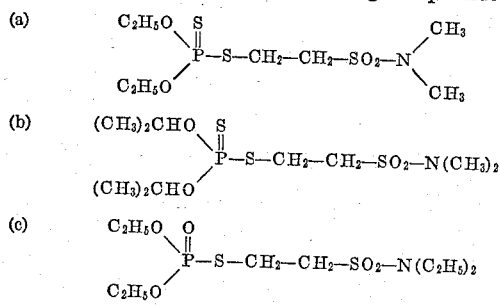

have been prepared by mixing the active ingredient with the same amount of dimethyl formamide as an auxiliary solvent adding thereafter 20% by weight referred to active ingredient of a commercial emulsifier consisting of a benzyl hydroxy polyglycol ether containing about 10 to 15 glycol residues, and diluting at last this premixture with water to the desired concentration indicated in the following paragraphs. The tests have been carried out in the following manner:

Against spider mites (contact-insecticidal action): bean plants (*Phaseolus vulgaris*) of about 15 inches height are sprayed drip wet with solutions prepared as indicated above. The bean plants have been infested heavily with the two-spotted spider (species *Tetranyohus telarius*).

Evaluation has been carried out after 24 hours, 48 hours and 8 days. Spider mites were killed completely with solutions of 0.001% according to compound (*a*); with solutions of 0.01% according to compound (*b*); and with solutions of 0.01% of compound (*c*).

Against aphids (species *Doralis fabae*). Heavily infested bean plants (*Vitia faba*) have been sprayed drip wet with solutions as prepared above in a concentration as shown below. The effect has been determined by evaluation after 24 hours by counting the dead pests either on the surface of the soil or still remaining on the plants. The following results have been obtained:

Compound (*a*): concentration of aqueous emulsion 0.001% active ingredient—killing rate 100%.
Compound (*c*): concentration of aqueous emulsion 0.01% active ingredient—killing rate 100%.

The reactions as described in greater detail in the following examples are generally applicable, and the examples are therefore not to be considered as a limitation of the invention.

*Example 1*

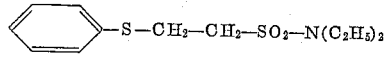

To 33 grams (0.2 mol) of vinyl-sulfonic acid diethylamide there are added with stirring 22 grams (0.2 mol) of thiophenol. The reaction product is kept at 70° C. for 2 hours and then heated in a distillation apparatus under a pressure of 1 mm. Hg to a bath temperature of 100° C. 51 grams of 2-phenyl-mercapto-ethyl sulfonic acid diethylamide are thus obtained as a yellow water-insoluble oil. Yield: 93% of the theoretical.

The above said vinyl-sulfonic acid diethylamide is obtained as follows: 163 grams of 2-chloroethane sulfonic acid chloride (1 mol) are dissolved in 600 millilitres of benzene. While cooling and stirring vigorously there is added at a temperature of 0—+5° C. a mixture of 80 grams (1.1 mol) of diethylamine and 220 grams (2.2 mol) of triethylamine in 250 millilitres of benzene. When the reaction has slowed down stirring is continued for a half an hour and the triethylamine hydrochloride is removed by filtration with suction. The filtrate is neutralized with diluted hydrochloric acid and at last with a 4% sodium bicarbonate solution. After drying of the benzenic layer the solvent is removed by distillation in vacuum. The residue distils at 3 mm. Hg at 84–86° C. There are obtained 83 grams of vinyl-sulfonic acid diethylamide, i.e., 51% of the theoretical.

*Example 2*

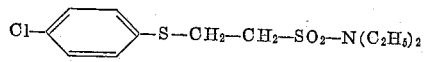

To 38 grams (0.23 mol) of vinyl-sulfonic acid diethylamide there are added with stirring 33 grams (0.23 mol) of p-chloro-thiophenol. The mixture is heated to 75° C. for 2 hours and the reaction product is then distilled under a pressure of 1 mm. Hg at a bath temperature of 100° C. as described in Example 1. 61 grams of a yellow oil are thus obtained which crystallizes after standing for a short time. Recrystallized from ligroin 2-(p-chlorophenyl)-thioethyl-sulfonic acid diethylamide shows a M.P. of 78–80° C. Yield: 86% of the theoretical.

*Example 3*

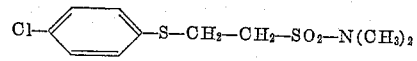

Under similar conditions there are obtained from 13.5 grams of vinyl-sulfonic acid dimethylamide and 14.5 grams of p-chlorothiophenol, 22 grams of 2-(p-chlorophenyl)-thioethylsulfonic acid dimethyl amide of M.P. 116–117° C. Yield: 79% of the theoretical.

The above said vinyl-sulfonic acid dimethylamide is obtained by reacting 124 grams of 2-chloroethane sulfonic acid chloride dissolved in 400 millilitres of benzene while cooling and stirring with 105 grams of dimethylamine (also dissolved in 105 millilitres of benzene and 100 millilitres of petrol ether). When the reaction smoothes stirring is continued for 1 hour at room temperature. After working up the reaction product as described in Example 1 there are obtained 45 grams of vinyl-sulfonic acid dimethylamide boiling at 4 mm. Hg at 90–91° C. The yield amounts to 44% of the theoretical.

*Example 4*

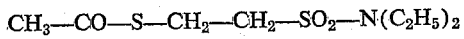
CH₃—CO—S—CH₂—CH₂—SO₂—N(C₂H₅)₂

32.5 grams (0.2 mol) of vinyl-sulfonic acid diethylamide are mixed with 15.5 grams (0.2 mol) of thioacetic acid. The mixture is heated to 80° C. for 2 hours and then worked up as described in Example 1. 33 grams of a yellow water-insoluble oil are thus obtained. Yield: 69% of the theoretical.

*Example 5*

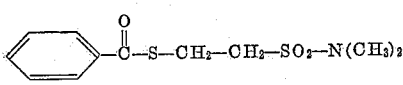

To 90 grams (0.67 mol) of vinyl-sulfonic acid dimethylamide there are added with stirring at 40° C. 92.5 grams (0.67 mol) of thiobenzoic acid. The temperature of the reaction product rises spontaneously to 80° C. and is maintained for another hour after completion of the reaction. After working up in usual manner, 130 grams of the new compound are obtained as a crystalline mass. When re-crystallized from petroleum ether, the compound shows a M.P. of 90–92° C. Yield: 71% of the theoretical.

*Example 6*

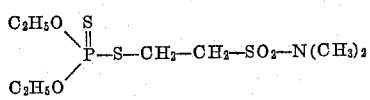

To 21 grams (0.15 mol) of vinyl-sulfonic acid dimethylamide (B.P. 90–91° C./4 mm. Hg) there are added 28 grams of diethyl-dithiophosphoric acid (0.15 mol). The temperature rises to 90° C. After completion of the reaction the reaction product is heated to 80–90° C. for another hour and then distilled under a pressure of 1 mm. Hg at a bath temperature of 100° C. 47 grams of a water-insoluble yellow oil are thus obtained. Yield: 97% of the theoretical.

*Example 7*

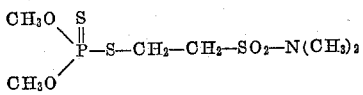

In a similar manner there are obtained from 27 grams of vinyl-sulfonic acid dimethylamide and 32 grams of dimethyl-dithiophosphoric acid 52 grams of a yellow water-insoluble oil. Yield: 89% of the theoretical.

*Example 8*

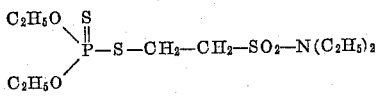

To 33 grams (0.2 mol) of vinyl-sulfonic acid diethylamide are added with stirring 37 grams (0.2 mol) of diethyl-dithiophosphoric acid. The temperature rises to 65° C. within about 3 minutes. After completion of the reaction the product is heated at 60–65° C. for another hour. After working up as usual 67 grams of the new derivatives of thionothiol-phosphoric acid are obtained as a pale yellow water-insoluble oil. Yield: 96% of the theoretical. On rats per os the new compound shows a mean toxicity of 50 mg./kg.

Solutions of 0.001% killing aphids 70%. Ovicidal action on spider mites 0.001%=90%. Systemic action on spider mites 0.1%=95%.

*Example 9*

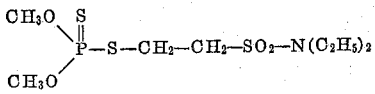

Under similar conditions there are obtained from 33 grams of vinyl-sulfonic acid diethylamide and 32 grams of dimethyl-dithiophosphoric acid 62 grams of the derivative of dimethyl-dithiophosphoric acid as a yellow water-insoluble oil. Yield: 96% of the theoretical.

On rats per os the new compound shows a mean toxicity of 1000 mg./kg. Aphids are killed completely with solutions of 0.001%. Ovicidal action on spider mites 0.001%=80%. Systemic action on spider mites 0.1%=100%.

*Example 10*

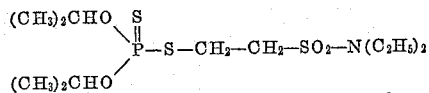

To 25 grams (0.15 mol) of vinyl-sulfonic acid diethylamide are added with stirring 32 grams (0.15 mol) of di-isopropyl-dithiophosphoric acid. The temperature spontaneously rises to 45° C. After completion of the reaction, the product is heated to 65° C. for a further hour and then worked up in usual manner; 53 grams of the new thionothiol-phosphoric acid ester are thus obtained as a yellow water-insoluble oil. Yield: 92% of the theoretical.

On rats per os the new compound shows a mean toxicity of 200 mg./kg.

*Example 11*

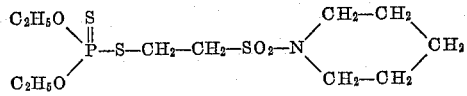

To 35 grams (0.2 mol) of vinyl-sulfonic acid piperidide (M.P. 30–32° C.) are added with stirring 37 grams of diethyl-dithiophosphoric acid. The temperature rises to 95° C. After completion of the reaction the product is kept at 70° C. for a further hour and then worked up in usual manner. 70 grams of the new derivative of diethyl-dithio-phosphoric acid are thus obtained as a yellow water-insoluble oil. Yield: 94% of the theoretical.

The above said vinyl-sulfonic acid piperidide is obtained as described in Examples 1 or 3 by starting from β-chloroethane sulfonic acid chloride and piperidine. The vinyl-sulfonic acid piperidide is obtained in a yield of 43% of the theoretical.

*Example 12*

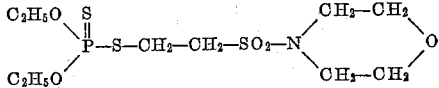

To 27 grams (0.15 mol) of vinyl-sulfonic acid morpholide (M.P. 45–46° C.) are added 28.5 grams (0.15 mol) of diethyl-dithio-phosphoric acid. The temperature rises to 40° C. The mixture is kept at 70° C. for a further hour and then worked up as usual. 51 grams of the derivative of diethyl-dithiophosphoric acid are thus obtained as a water-insoluble yellow oil. Yield: 94% of the theoretical. Spider mites are killed to 90% with solutions of 0.01%.

*Example 13*

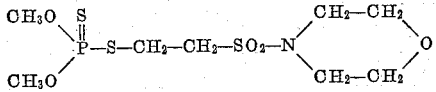

To 27 grams (0.15 mol) of vinyl-sulfonic acid morpholide are added 24 grams (0.15 mol) of dimethyl-dithio-phosphoric acid. The temperature spontaneously rises to 57° C. The mixture is kept at 70° C. for a further hour and then worked up in usual manner. 45 grams of the derivative of dimethyl-dithiophosphoric acid are thus obtained as a yellow water-insoluble oil. Yield: 89% of the theoretical. Aphids and spider mites are killed completely with solutions of 0.1%. Systemic action on spider mites with solutions of 0.1% is 100%.

*Example 14*

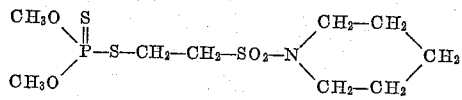

To 35 grams (0.2 mol) of vinyl-sulfonic acid piperidide (M.P. 30–32° C.) there are added 31.5 grams (0.2 mol) of dimethyl-dithiophosphoric acid. The temperature rises to 31° C. The product is heated to 70° C. for a further 2 hours and then worked up in the indicated manner. 19 grams of the derivative of diethyl-dithiophosphoric acid are thus obtained as a pale yellow water-insoluble oil. Yield: 95% of the theoretical.

*Example 15*

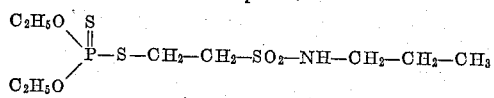

To 9 grams of vinyl-sulfonic acid propyl amide (B.P. 0.2 mm. Hg/107–110° C.) are added with stirring 11.5 grams of diethyl-dithiophosphoric acid. The temperature rises to 31° C. The mixture is heated to 70° C. for a further 2 hours and then worked up in the indicated manner. 19 grams of the derivative of diethyl-dithiophosphoric acid are obtained as a light yellow water-insoluble oil. Yield: 95% of the theoretical.

The vinyl-sulfonic acid propyl amide may be obtained exactly as described in Examples 1 and 3, second part.

*Example 16*

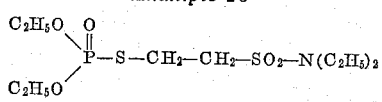

To 24 grams (0.15 mol) of vinyl-sulfonic acid diethylamide are added with stirring 26 grams (0.15 mol) of diethyl-thiolphosphoric acid. After completion of the reaction the product is heated at 70° C. for a further 2 hours and then worked up in usual manner. 46 grams of the derivative of diethyl-thiolphosphoric acid are thus obtained as a yellow water-insoluble oil. Yield: 92% of the theoretical.

Using instead of 26 grams of diethylthiolphosphoric acid the exact corresponding molecular amount of (O-ethyl)-ethylthiolphosphonic acid there is obtained the following ester

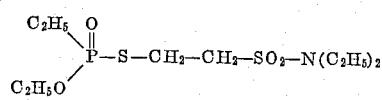

*Example 17*

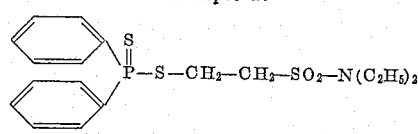

Into 24.5 grams (0.15 mol) of vinyl-sulfonic acid diethylamide are stirred 37.5 grams (0.15 mol) of diphenyl-thionothiol-phosphinic acid (M.P. 53–56° C.). The temperature gradually rises to 50° C. After completion of the reaction the product is heated to 70° C. for a further hour and then worked up in usual manner. 51 grams of the derivative of diphenyl-thionothiol-phosphonic acid are thus obtained as a green viscous oil. Yield: 83% of the theoretical.

By the same way but using instead of 37.5 grams of diphenyl-thionothiol-phosphinic acid the exact corresponding molecular amount of dimethyl-thionothiol-phosphinic acid there is obtained the ester of the following formula

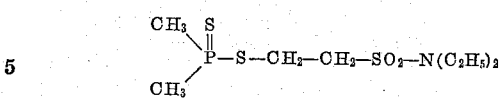

*Example 18*

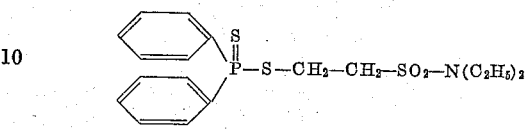

Under similar conditions there are obtained from 25.5 grams of vinyl-sulfonic acid diethyl amide and 36.5 grams of diphenyl-thiolphosphinic acid (M.P. 136–139° C.) 51 grams of the derivative of diphenyl-thiolphosphinic acid as a viscous yellow oil. Yield: 83% of the theoretical.

By the same way but using instead of 36.5 grams of diphenyl-thiolphosphinic acid the corresponding equimolecular amount of (O-ethyl)-phenylthiolphosphonic acid there is obtained the ester of the following formula

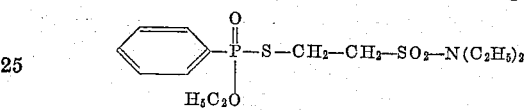

*Example 19*

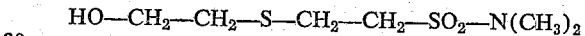

To 34.5 grams (0.256 mol) of vinyl-sulfonic acid dimethylamide (B.P. 90–91° C./4 mm. Hg) are added 20 grams (0.256 mol) of 2-hydroxyethyl-mercaptan of B.P. 52° C./10 mm. Hg and then 2–3 drops of triethylamine at 25° C. Despite immediate external cooling with ice-water, the temperature rises to 110° C. within a few seconds. The reaction is allowed to terminate, and the product is then kept at 100° C. under an ejector vacuum for 10 minutes. The oil thus obtained (51 grams) solidifies after prolonged standing. M.P. 23–26° C. Yield: 94% of the theoretical.

*Example 20*

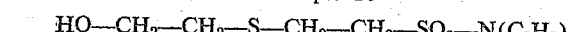

In a similar manner there are obtained from 33 grams (0.2 mol) of vinyl-sulfonic acid diethyl amide (B.P. 84–86° C./3 mm. Hg) and 16 grams (0.2 mol) of 2-hydroxy-ethyl-mercaptan, 44 grams of a colorless oil of B.P. 135–140° C./0.01 mm. Hg. Yield: 92% of the theoretical.

*Example 21*

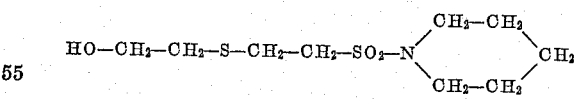

The above compound is obtainable from 35 grams (0.2 mol) of vinyl-sulfonic acid piperidide of M.P. 30–32° C. and 16 grams of 2-hydroxy-ethyl-mercaptan (0.2 mol). The product thus obtained is solid and re-crystallized from a mixture of benzene and petroleum ether. 41 grams of the new preparation of M.P. 62–64° C. are thus obtained. Yield: 81% of the theoretical.

*Example 22*

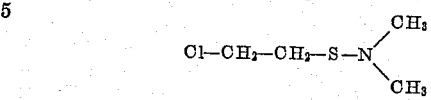

108 grams (0.825 mol) of β-chloroethyl sulfenic acid chloride are dissolved in 200 millilitres of petrol ether. This solution is added while stirring and at a temperature of +5° C. to 115 grams (2.5 mols) of dimethylamine in 300 millilitres of benzene. The temperature is kept for 1 further hour at 10° C. and then there are added 200 millilitres of ice-water. The water is separated, and the petrol ether is dried over sodium sulfate. While fractionating there are obtained 60 grams of β-chloroethyl sulfenic acid dimethyl amide (B.P. 4 mm./39° C.). Yield: 52% of the theoretical. The sulfenic acid chloride is preferably worked up straight away, because of its decomposition properties while standing.

*Example 23*

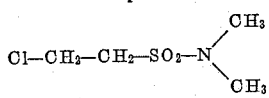

42 grams (0.3 mol) of the β-chloroethyl sulfenic acid dimethylamide as prepared in Example 22 are dissolved in 50 millilitres of acetone. To this solution there are added dropwise while stirring and at a temperature of +5-+10° C. 79 grams (0.5 mol) of potassium permanganate and 62 grams of magnesium sulfate in 400 millilitres of water and 200 millilitres of acetone. The temperature is kept for 1 further hour while stirring. At a temperature of 10-20° C. there is added sulfur dioxide, until the pyrolusite formed is soluble (2-3 hours). This solution is extracted with ether, the ethereal layer is separated and the ether solution is dried over sodium sulfate. After the ether is distilled off there is obtained a residue which easily crystallizes from a mixture of equal parts of benzene and petrol ether in form of long white needles. There are obtained 35 grams of the β-chloroethyl sulfonic acid dimethylamide (M.P. 81-82° C.). Yield: 69% of the theoretical.

*Example 24*

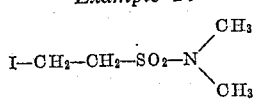

8.5 grams (0.05 mol) of β-chloroethane sulfonic acid dimethylamide and 10 grams of sodium iodide are dissolved in 20 millilitres of methyl ethyl ketone. The temperature is heated to 80° C. while stirring. To this solution there is added 50 millilitres of acetone. Then the solution is filtered off with suction from the formed salts. After distilling off the solvent in vacuum there is obtained a residue which is solid quickly; while crystallizing from water there are obtained 9 grams of the β-ethyl iodide sulfonic acid dimethylamide (M.P. 120-121° C.). Yield: 68% of the theoretical.

*Example 25*

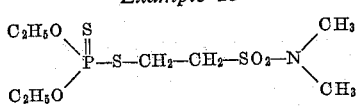

13 grams (0.05 mol) of β-iodoethane-sulfonic acid dimethylamide (M.P. 120-121° C.) are added at 60° C. to a solution of 12.5 grams (0.06 mol) of the sodium salt of diethyl dithiophosphoric acid in 60 millilitres of water and 20 millilitres of methyl ethyl ketone. The mixture is heated to the boil with vigorous stirring for 5 hours. The mixture is then cooled and diluted with ice-water. The separated oil is taken up in chloroform and dried over sodium sulfate. The solvent is distilled off under vacuum. The residue thus obtained is kept under a pressure of 1 millilitre Hg at a bath temperature of 60° C. for a short time in order to remove the solvent completely. 10 grams of the new ester are thus obtained as a pale yellow water-insoluble oil. Yield: 62% of the theoretical.

Another way for the preparation of the above compound is the following: 10.5 grams (0.05 mol) of β-chloroethane-sulfonic acid dimethyl amide (M.P. 81-82° C.) are added to a solution of 12.5 grams of the sodium salt of diethyl dithiophosphoric acid in 60 millilitres of water and 20 millilitres of methyl ethyl ketone. The mixture is heated to the boil with vigorous stirring for 10 hours. It is then cooled and diluted with water. The separated oil is worked up as described in Example 25. 8 grams of the new ester are thus obtained. Yield: 51% of the theoretical. Toxicity on rats per os 25-50 mg./kg. Spider mites and aphids are killed completely with solutions of 0.001%. Ovicidal action 0.1%.

By the same way but using instead of β-iodoethane sulfonic acid dimethylamide exactly the equimolecular amount of the corresponding piperidide or morpholide there are obtained the esters of the following formulas

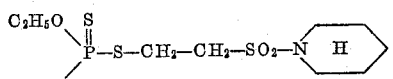

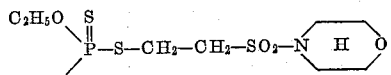

By the same way but using instead of the above shown diethyl dithiophosphoric acid the corresponding amount of the analogous thiolphosphoric acid there is obtained the ester of the following formula

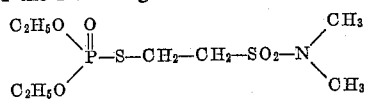

By the same way but using instead of the above shown β-chloroethane sulfonic acid dimethylamide the equimolecular amount of β-chloropropane sulfonic acid dimethylamide there is obtained the ester of the following formula

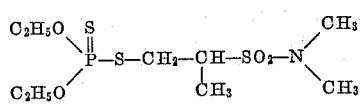

By the same way but using instead of the above shown sodium salt of diethyl dithiophosphoric acid the corresponding amount of the dimethyl compound there is obtained the ester of the following formula

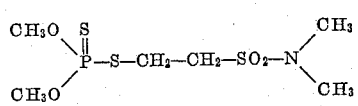

*Example 26*

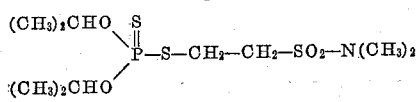

26 grams (0.10 mol) of β-iodoethane-dimethyl sulfonamide and 26 grams of the ammonium salt of diisopropyl-dithiophosphoric acid (0.11 mol) are heated to the boil under reflux in 120 millilitres of water and 30 millilitres of methyl ethyl ketone. After boiling (at 80° C.) for 4 hours, the reaction product is cooled, the separated oil is taken up with chloroform, dried and the solvent removed. The residue solidifies after standing for some time. After recrystallization from benzene, 26 grams of the new ester of M.P. 37-39° C. are obtained. Yield: 75% of the theoretical. Toxicity on rats per os LD 50 100 mg./kg. Spider mites and larvae of flies (*Musca domestica*) are killed completely with solutions of 0.01%; ovicidal action 0.1%.

By the same way but using instead of the dithiophosphoric acid ester the corresponding amount of the thiolphosphoric acid ester there is obtained the following compound

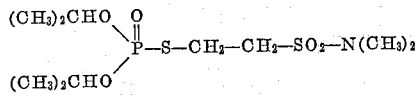

By the same way but using instead of the dimethyl sulfonamide the corresponding amount of the diethyl sulfonamide there is obtained the ester of the following formula

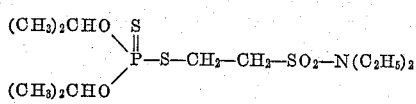

We claim:

1. A compound of the following formula

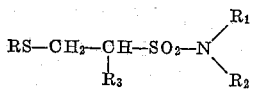

in which R stands for a member selected from the group consisting of O,O-lower alkyl phosphoric acid radicals, O,O-lower alkyl thiophosphoric acid radicals, O-lower alkyl phosphonic acid radicals, O-lower alkyl thionophosphonic acid radicals, phosphinic acid radicals and thionophosphinic acid radicals,

stands for a member selected from the group consisting of —$NH_2$, mono-lower alkylamino, di-lower alkylamino, piperidino and morpholino, and $R_3$ stands for a member selected from the group consisting of hydrogen and lower alkyl.

2. A compound of the formula

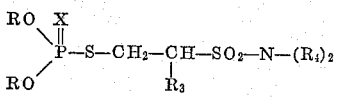

wherein X is a chalcogen having an atomic weight from 16 to 33, R and $R_4$ are lower alkyl radicals and $R_3$ is a member selected from the group consisting of H and lower alkyl.

3. A compound of the formula

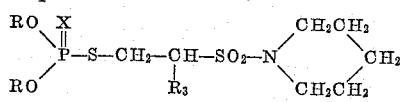

wherein X is a chalcogen having an atomic weight from 16 to 33, R is a lower alkyl radical and $R_3$ is a member selected from the group consisting of H and lower alkyl.

4. A compound of the formula

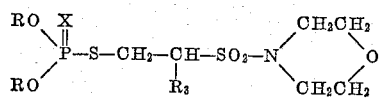

wherein X is a chalcogen having an atomic weight from 16 to 33, R is a lower alkyl radical and $R_3$ is a member selected from the group consisting of H and lower alkyl.

5. A compound of the formula

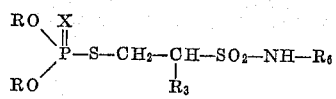

wherein X is a chalcogen having an atomic weight from 16 to 33, R is a lower alkyl radical, $R_6$ is lower alkyl and $R_3$ is a member selected from the group consisting of H and lower alkyl.

6. A compound of the formula

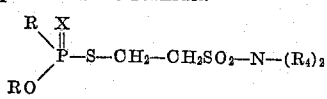

wherein X is a chalcogen having an atomic weight from 16 to 33, and R and $R_4$ are lower alkyl radicals.

7. A compound of the formula

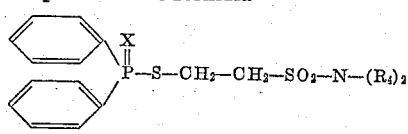

wherein X is a chalcogen having an atomic weight from 16 to 33, and $R_4$ is a lower alkyl radical.

8. A compound of the formula

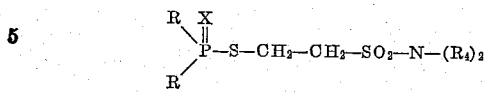

wherein X is a chalcogen having an atomic weight from 16 to 33, and R and $R_4$ are lower alkyl radicals.

9. A compound of the formula

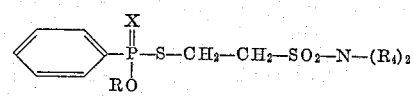

wherein X is a chalcogen having an atomic weight from 16 to 33, and R and $R_4$ are lower alkyl radicals.

10. The sulfonic acid amide of the following formula

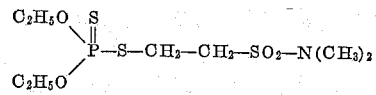

11. The sulfonic acid amide of the following formula

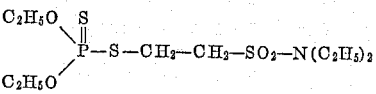

12. The sulfonic acid amide of the following formula

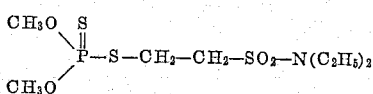

13. The sulfonic acid amide of the following formula

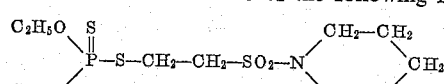

14. The sulfonic acid amide of the following formula

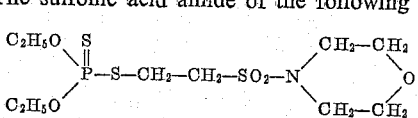

15. The sulfonic acid amide of the following formula

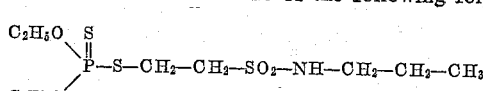

16. The sulfonic acid amide of the following formula

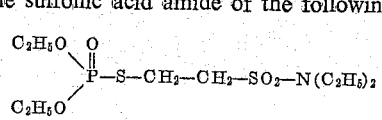

17. The sulfonic acid amide of the following formula

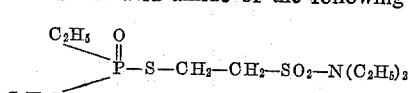

18. The sulfonic acid amide of the following formula

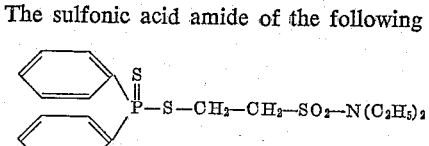

19. The sulfonic acid amide of the following formula

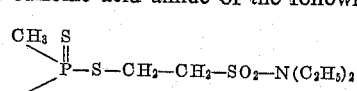

20. The sulfonic acid amide of the following formula
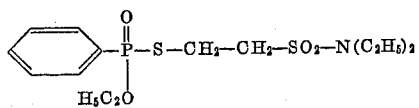
21. The thiophosphoric acid ester of the following formula
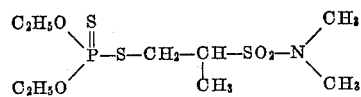
No references cited.